United States Patent [19]

Viot et al.

[11] Patent Number: 5,737,493

[45] Date of Patent: Apr. 7, 1998

[54] INSTRUCTION SET FOR EVALUATING FUZZY LOGIC RULES

[75] Inventors: J. Greg Viot, Austin; James M. Sibigtroth, Round Rock; Marlan L. Winter, Austin, all of Tex.

[73] Assignee: Motorola, Inc., Schaumburg, Ill.

[21] Appl. No.: 570,453

[22] Filed: Dec. 11, 1995

[51] Int. Cl.$^6$ .................................................. G06G 7/00
[52] U.S. Cl. ........................................ 395/3; 395/900
[58] Field of Search ................................ 395/3, 900

[56] References Cited

U.S. PATENT DOCUMENTS

| | | | |
|---|---|---|---|
| 4,628,435 | 12/1986 | Tashiro et al. | 364/130 |
| 4,694,418 | 9/1987 | Ueno et al. | 395/3 |
| 4,716,540 | 12/1987 | Yamakawa | 395/3 |
| 4,837,725 | 6/1989 | Yamakawa | 395/3 |
| 4,860,243 | 8/1989 | Ueno et al. | 395/3 |
| 4,918,620 | 4/1990 | Ulug | 395/75 |
| 4,961,225 | 10/1990 | Hisano | 380/28 |
| 5,036,730 | 8/1991 | Sakai et al. | 74/866 |
| 5,058,033 | 10/1991 | Bonissone et al. | 395/51 |
| 5,136,685 | 8/1992 | Nagazumi | 395/3 |
| 5,148,977 | 9/1992 | Hibino et al. | 236/49.3 |
| 5,149,472 | 9/1992 | Suganuma | 264/40.6 |
| 5,165,011 | 11/1992 | Hisano | 395/54 |
| 5,168,549 | 12/1992 | Takagi et al. | 395/3 |
| 5,170,357 | 12/1992 | Sasaki et al. | 364/471.03 |
| 5,175,795 | 12/1992 | Tsuda et al. | 395/3 |
| 5,179,629 | 1/1993 | Nakamura | 395/3 |
| 5,179,634 | 1/1993 | Matsunaga et al. | 395/75 |
| 5,189,636 | 2/1993 | Patti et al. | 364/786.01 |
| 5,189,728 | 2/1993 | Yamakawa | 395/51 |
| 5,229,946 | 7/1993 | Ghaem | 364/431.04 |
| 5,239,616 | 8/1993 | Hisano | 395/3 |
| 5,243,687 | 9/1993 | Ando | 395/3 |
| 5,263,125 | 11/1993 | Viot et al. | 395/51 |
| 5,276,767 | 1/1994 | Nakamura | 395/3 |
| 5,285,376 | 2/1994 | Struger | 395/12 |
| 5,295,229 | 3/1994 | Viot et al. | 395/51 |
| 5,299,283 | 3/1994 | Hamamoto | 395/3 |
| 5,381,517 | 1/1995 | Thorndike | 395/61 |
| 5,388,190 | 2/1995 | Nakano | 395/3 |
| 5,422,979 | 6/1995 | Eichfeld | 395/3 |
| 5,430,828 | 7/1995 | Yamamoto | 395/3 |
| 5,463,719 | 10/1995 | Okazaki | 395/51 |
| 5,479,566 | 12/1995 | Ishimoto | 395/3 |
| 5,479,568 | 12/1995 | Hisano | 395/3 |

OTHER PUBLICATIONS

Bannatyne, Optimizing fuzzy logic on standard microcontrolls.

Bannatyne, microcontrollers and fuzzy logic for embedded control.

Kim and others, "Design and implementation of a fuzzy application development system for KAFA," Journal of the Korea Information Science Society, vol. 22, No. 8, pp. 1227–1238, Aug. 1995.

Omron Corporation, "FP-3000 Digital Fuzzy Processor User's Manual," pp. 1–29.

Sibigtroth, James M., "Creating Fuzzy Micros,"Embedded Systems Programming, vol. 4, No. 12, Dec. 1991, 1991 Miller Freeman Publications.

Sibigtroth, James M., "Implementing Fuzzy Expert Rules in Hardware," AI Expert, Apr. 1992, vol. 7, No. 4, pp. 25–31.

*Primary Examiner*—Tariq R. Hafiz
*Assistant Examiner*—Jeffrey S. Smith

[57] ABSTRACT

A circuit (14) to evaluate a plurality of fuzzy logic rules as executable instructions in a data processor (310). A first instruction retrieves a fuzzy input value from memory (32) and stores it in an accumulator (58). A second instruction retrieves a second fuzzy input value from memory (32) and compares it to the fuzzy input value stored in the accumulator (58). The minimum value of the two fuzzy input values is then allowed to remain in the accumulator (58). Another program instruction retrieves a fuzzy output value from memory (32) and compares it to the value in the accumulator (58). The maximum of these two values is then determined by the instruction and this maximum value is then stored in memory (32).

9 Claims, 5 Drawing Sheets

INSTRUCTION SET FOR EVALUATING FUZZY LOGIC RULES

CROSS REFERENCE TO RELATED APPLICATION

This Application is related to co-pending patent application entitled:

DATA PROCESSING SYSTEM FOR EVALUATING FUZZY LOGIC RULES AND METHOD THEREFOR, Ser. No. 08/363,434, Attorney Docket Number SC-02395A, by J. Greg Viot and filed on Dec. 22, 1994;

U.S. Pat. No. 5,295,229; and

U.S. Pat. No. 5,263,125, each of which are hereby incorporated by reference herein.

TECHNICAL FIELD

This invention relates generally to a data processing system, and more particularly to execution of a fuzzy logic operation in a data processing system.

BACKGROUND INFORMATION

Data processors have been developed to function as binary machines whose inputs and outputs are interpreted as ones or zeroes, and no other possibilities may exist. While this works well in most situations, sometimes an answer is not simply "yes" or "no," but somewhere in between. A concept referred to as "fuzzy logic" was developed to enable data processors based on binary logic to provide an answer between "yes" and "no."

Fuzzy logic is a logic system which has membership functions with fuzzy boundaries. Membership functions translate subjective expressions, such as "a temperature is warm," into a value which typical data processors can recognize. A label such as "warm" is used to identify a range of input values whose boundaries are not points at which the label is true on one side and false on the other side. Rather, in a system which implements fuzzy logic, the boundaries of the membership functions gradually change and may overlap a boundary of an adjacent membership set. Therefore, a degree of membership is typically assigned to an input value. For example, if a range of temperatures provide the membership functions, an input temperature may fall in the overlapping areas of both the functions labeled "cool" and "warm." Further processing would then be required to determine a degree of membership in each of the membership functions (i.e. the degree to which the current temperature fits into each of the membership sets cool and warm).

A step referred to as "fuzzification" is used to relate an input to a membership function in a system which implements fuzzy logic. The fuzzification process attaches concrete numerical values to subjective expressions such as "the temperature is warm." These numerical values attempt to provide a good approximation of human perception.

After the fuzzification step, a step referred to as rule evaluation is executed. During the rule evaluation step, rule expressions that depend on fuzzy input values are evaluated to derive fuzzy outputs. For example, assume a rule to be evaluated may be stated as:

If (Temperature is warm) and (Pressure is high), then (Fan speed is medium).

In this rule, two antecedents, "Temperature is warm" and "Pressure is high" must be evaluated to determine a rule strength of the consequence, "Fan speed is medium." During the rule evaluation step, the degree to which an antecedent is true affects the degree to which the rule is true. The minimum of the antecedents is applied as the rule strength of the consequence of the rule. Additionally, when more than one rule is to be evaluated, a possibility exists for an action to be assigned more than one rule strength. In such a situation, the rule strength with a greater value should be assigned to the action. Therefore, the action is assigned a rule strength of greatest value.

The last step in the fuzzy logic process is referred to as "defuzzification." This step resolves competing results of the rule evaluation step into a single action. Defuzzification is the process of combining all of the fuzzy outputs into a composite result which may be applied to a standard data processing system. For more information about fuzzy logic, refer to an article entitled "Implementing Fuzzy Expert Rules in Hardware" by James M. Sibigtroth. The article was published in the April 1992 issue of AI EXPERT on pages 25 through 31.

In summary, rules are made up of a series of premises (antecedents) followed by one or more actions (consequences). Each antecedent corresponds to a fuzzy input and each action corresponds to a fuzzy output. In a hardware implementation of the rule evaluation step, dedicated connections and circuits are used to relate fuzzy inputs to fuzzy outputs. This approach often requires dedicated memory circuitry and is inflexible. In a software implementation of the rule evaluation step, a program of instructions is used to evaluate rules. The software approach is typically slower than the hardware approach and requires a significant amount of program and data memory. In an industry where data must be computed, moved, and manipulated as quickly as possible, fast execution times are essential.

Therefore, a need exists for a software approach for performing the rule evaluation step quickly and efficiently.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

The present invention provides a circuit and a method for executing a rule evaluation step in a fuzzy logic operation in a data processing system quickly and with a minimum amount of circuitry. The rule evaluation step is encoded in an instruction set (a program) which is efficiently executed without an excessive amount of added circuitry in the data processing system. Therefore, the present invention provides an instruction set which allows the user of the data processing system to perform the rule evaluation step quickly without lengthy and time consuming software programs.

During a description of the implementation of the invention, a hexadecimal value may be indicated by a "$" symbol preceding a value.

Figure 1:
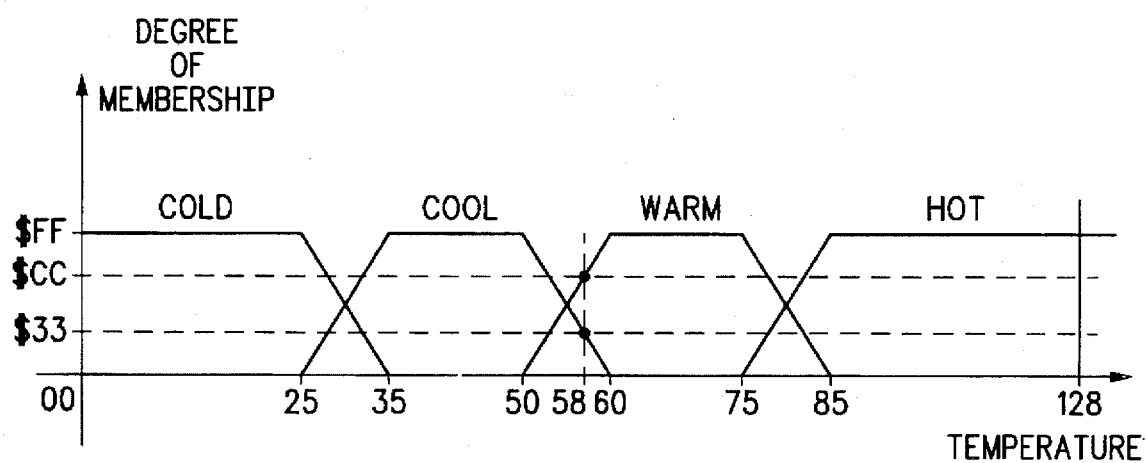
FIG. 1 illustrates in graph diagram form some general concepts and basic terminology used to describe fuzzy logic.

FIG. 1 provides a graph illustrating a few basic terms and concepts of fuzzy logic. In the fuzzy logic system described in FIG. 1, a "system input" is temperature in degrees Fahrenheit. Four "membership functions" are provided to give labels to a range of temperatures. For example, from 0 degrees to 35 degrees, a temperature is labeled "cold." Similarly, from 25 degrees to 60 degrees, the temperature is labeled "cool." Notice that the boundaries of each of the membership sets overlaps the boundaries of the adjacent sets. Therefore, a temperature may be in more than one membership set. For example, assume that the system input indicates a temperature of 58 degrees. Referring to FIG. 1, notice that 58 degrees is within the boundaries of both the cool and warm membership sets. However, a degree of membership in each of the membership sets may be obtained. The system input has a degree of membership having a hexadecimal value of $33 for the cool membership set and a degree of membership having a hexadecimal value of $CC for the warm membership set. If the system input had indicated a temperature of 70 degrees, the temperature would have had a degree of membership with a hexadecimal value of $FF in the warm membership set. Likewise, the temperature of 70 degrees would have a degree of membership having a hexadecimal value of $00 in the hot membership set. In the fuzzy logic system described in FIG. 1, a degree of membership may range from a hexadecimal value of $00 to $FF, which corresponds to a fraction from 0.00 to 0.996. Those skilled in the art will recognize that a two digit hexadecimal value may be represented by an eight bit binary value.

Figure 2:
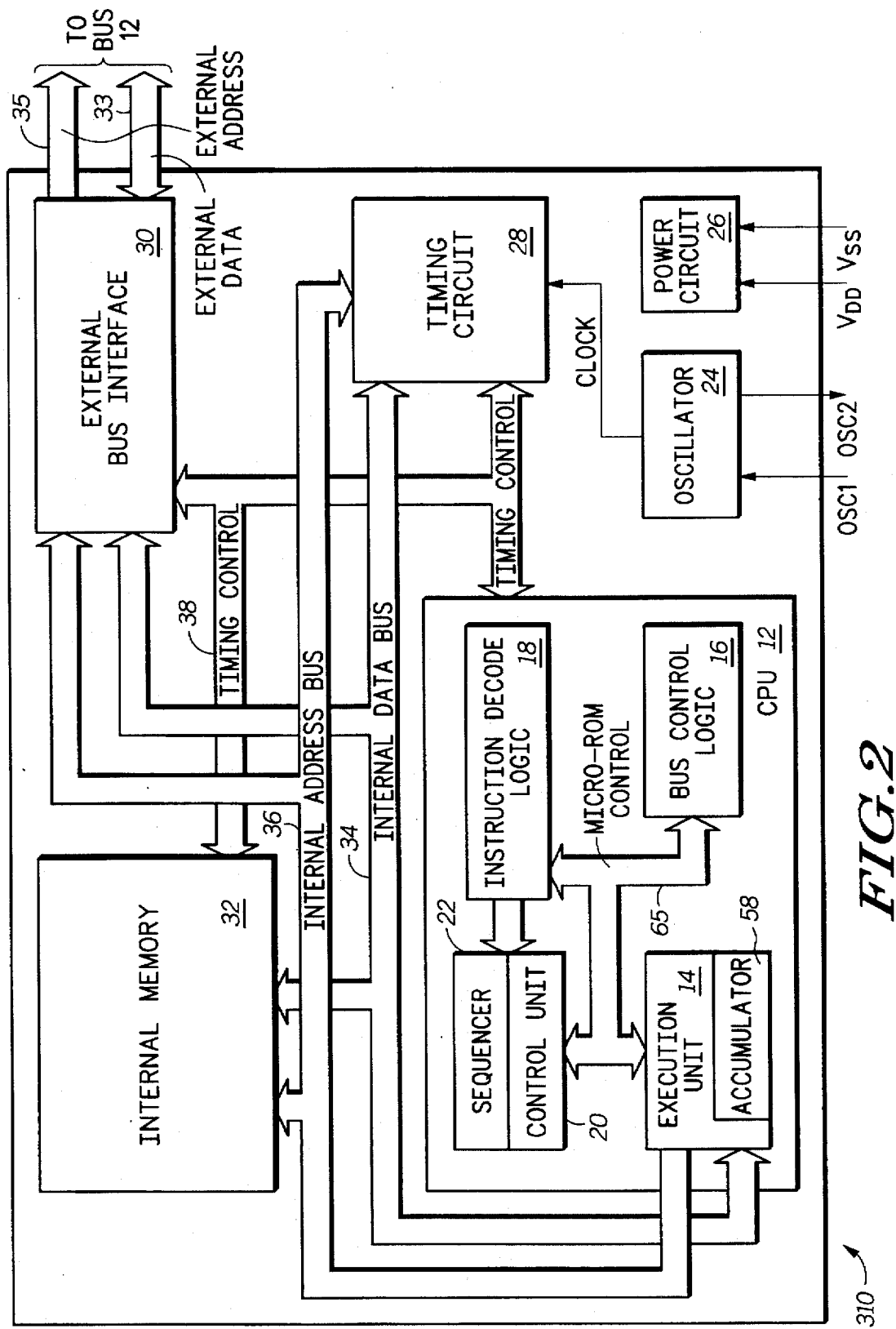
FIG. 2 illustrates in block diagram form an integrated circuit ("chip"), including a central processing unit ("CPU"), in accordance with the present invention.

One implementation of the instructions and method of operation for the present invention may be implemented in a modified form of a MC68HC11 micro controller. The MC68HC11 is an eight bit micro controller which includes sixteen bit addresses and storage registers and is available from Motorola, Inc. of Austin, Tex. This implementation is illustrated in greater detail in FIG. 2. FIG. 2 depicts microprocessor chip (integrated circuit) 310 in which the instruction set may be implemented. Microprocessor chip 310, which may be a special purpose micro controller or a general purpose microprocessor, generally includes a central processing unit (CPU) 12, an oscillator 24, a power circuit 26, a timing circuit 28, an external bus interface 30, and an internal memory 32. CPU 12 generally has an execution unit 14, a bus control logic circuit 16, an instruction decode logic circuit 18, a control unit 20, and a sequencer 22.

During operation, an "Osc 1" signal is provided to oscillator 24 via an external source, such as a crystal. The crystal is connected between the Osc 1 and Osc 2 signals to enable the crystal to oscillate. The Osc 1 provides a "Clock" signal to a remaining portion of microprocessor chip 310. Operation of a crystal oscillator is well known in the data processing art and should be apparent to one with ordinary skill in the art.

Power circuit 26 receives both a "Vdd" and a "Vss" signal from an external power source. The Vdd signal provides a positive 5 volts and the Vss signal provides a reference, or ground voltage. The Vdd and Vss signals are provided to each of the remaining components of microprocessor chip 310. The routing of these signals is well known in data processing art and will be apparent to one with ordinary skill in the art.

Timing circuit 28 receives the Clock signal and subsequently provides appropriate timing signals to each of CPU 12, external bus interface 30, and internal memory 32 via a Timing Control bus 38.

A plurality of address values are provided from external bus interface 30 to an External Address bus 35. Similarly, a plurality of data values are communicated by external bus interface 30 via an External Data bus 33. External bus interface 30 controls receipt and transmission of address and data values between an external user and microprocessor chip 310. External bus interface 30 communicates a plurality of address and data values to a remaining portion of microprocessor chip 310 via an Internal Address bus 36 and an Internal Data bus 34, respectively.

Internal memory 32 functions to store information necessary for the proper operation of microprocessor chip 310. Additionally, other data values may be stored therein if specified in a user program provided via Internal Address bus 36 and Internal Data bus 34.

CPU 12 executes each of the instructions required during operation of microprocessor chip 310. Internal Address bus 36 and Internal Data bus 34 communicate information between execution unit 14 and a remaining portion of microprocessor chip 310. Bus control logic circuit 16 fetches instructions and operands. Each of the instructions is then decoded by instruction decode logic circuit 18 and provided to control unit 20 and sequencer 22. Control unit 20 and sequencer 22 maintain a sequence of execution of each of the instructions to most efficiently utilize the computing capabilities of microprocessor chip 310. Additionally, control unit 20 includes a Micro-ROM memory (not shown) which provides a plurality of control information to each of execution unit 14, bus control logic 16, and instruction decode logic 18 via a Micro-ROM Control Bus 65. The plurality of control information is necessary for proper execution of the instruction set.

Execution unit 14 includes accumulator 58 for temporarily storing values, as will be described in more detail below. An accumulator is also known as a processor register.

Further detail of a typical execution unit capable of performing the instruction set of the present invention is discussed in cross-referenced U.S. Pat. No. 5,263,125.

Background in the processing of instructions may be found in "*Computer System Architecture,*" M. Morris Mano, 2nd Edition, 1982, pp. 137–167, which is hereby incorporated by reference herein.

Figure 3:
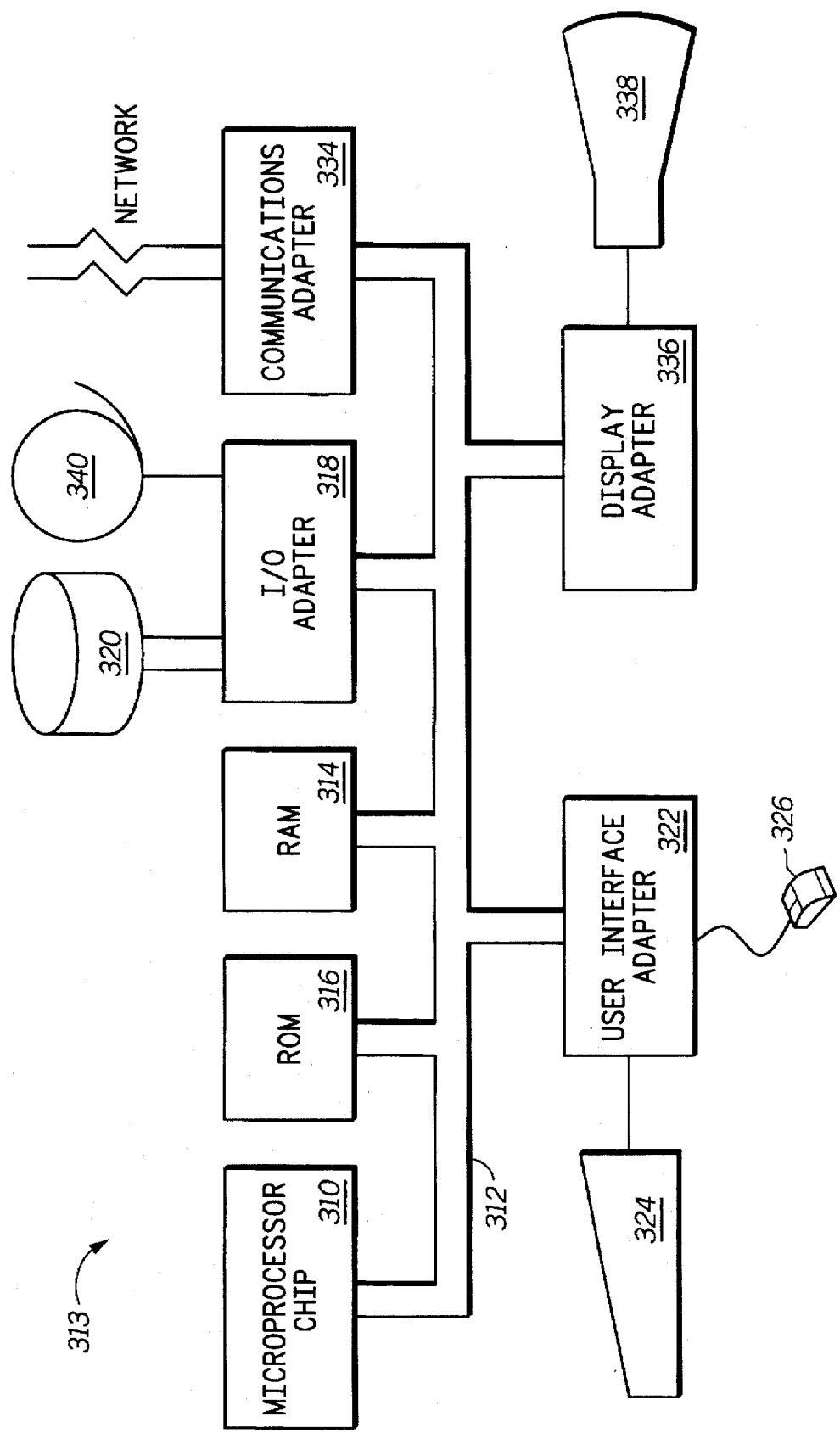
FIG. 3 illustrates in block diagram form a data processing system incorporating the chip shown in FIG. 2.

A representative hardware environment for practicing the present invention is depicted in FIG. 3, which illustrates a typical hardware configuration of a workstation in accordance with the subject invention having microprocessor chip 310 and a number of other units interconnected via system bus 312. The workstation shown in FIG. 3 includes random access memory (RAM) 314, read only memory (ROM) 316, and input/out-put (I/O) adapter 318 for connecting peripheral devices such as disk units 320 and tape drives 340 to bus 312, user interface adapter 322 for connecting keyboard 324, mouse 326, and/or other user interface devices such as a touch screen device (not shown) to bus 312, communication adapter 334 for connecting the workstation to a data processing network, and display adapter 336 for connecting bus 312 to display device 338. As noted above, microprocessor chip 310 may include other circuitry not shown herein, which will include circuitry commonly found within a microprocessor, e.g., execution unit, bus interface unit, arithmetic logic unit, etc.

Figure 4:
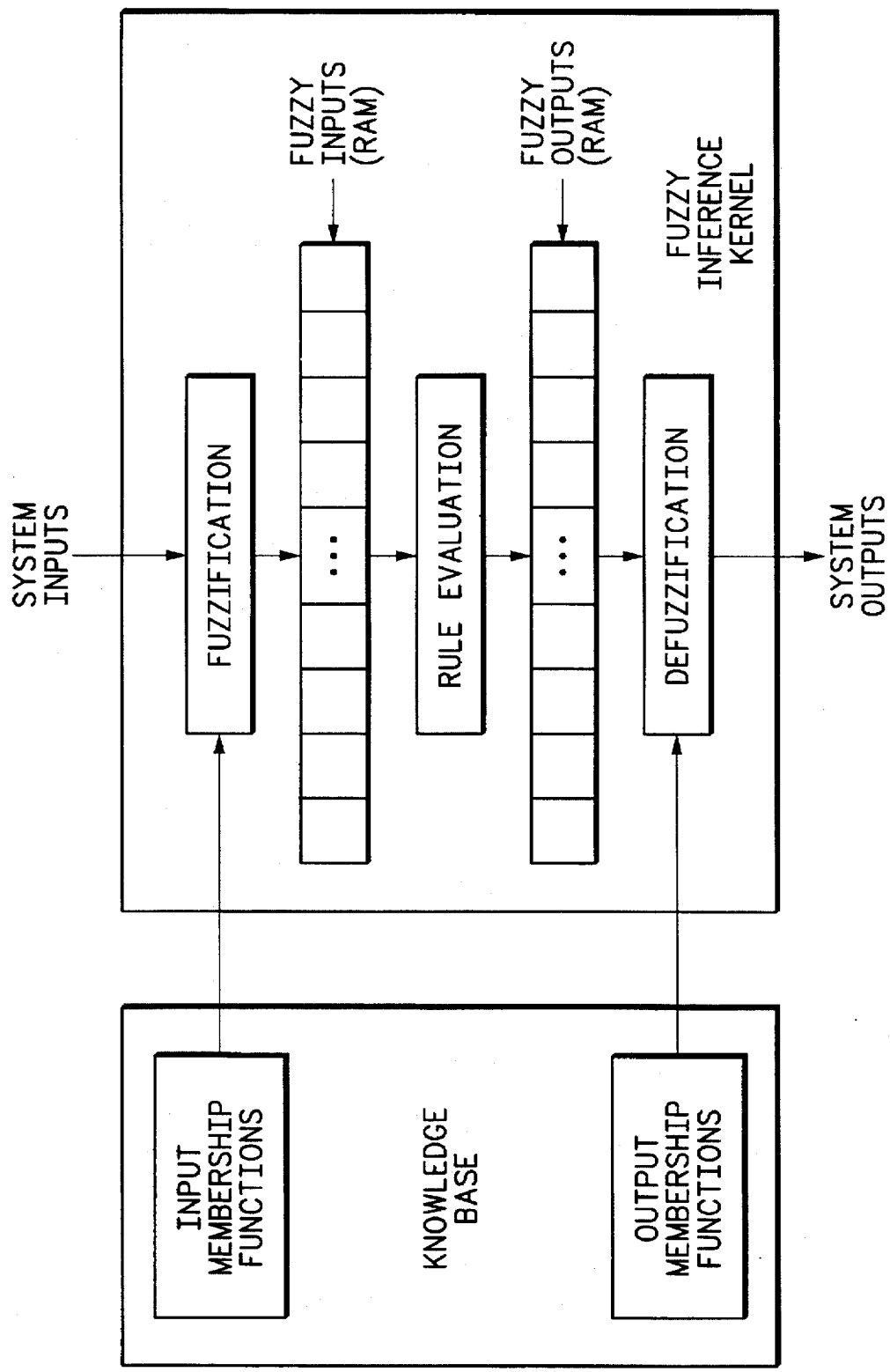
FIG. 4 illustrates in block diagram form a fuzzy inference system in accordance with the present invention.

Referring next to FIG. 4, there is illustrated in block diagram form a process for implementing a fuzzy inference system. Such a fuzzy inference system may be implemented on system 313. A fuzzy inference kernel receives system inputs and eventually produces system outputs. This is done by receiving the system inputs and performing a fuzzification process in which a system input signal is assigned a degree of membership to each of a plurality of defined membership sets or functions that are stored within a knowledge base of the particular system. Each of the degrees of membership assigned to a fuzzy input is stored in a predetermined memory location in either internal memory 32 or some other storage location such as RAM 314. Assignation of each of the degrees of membership to a plurality of fuzzy inputs is disclosed in more detail in the cross-referenced co-pending patent application entitled, "A Circuit And Method For Determining Membership In A Set During A Fuzzy Logic Operation," Ser. No. 07/899,975.

Assume, in the example described herein, that two groups of membership sets are used during fuzzification of a first and a second system input. A first one of the two groups provides temperature measurements which are separated into membership sets of cold, cool, warm, and hot. When fuzzified, a degree of membership of the first system input in the cool membership set is referred to using a variable labeled $T_{cool}$. Similarly, a degree of membership of the first system input in each of the cold, warm, and hot membership sets is referred to a respective one of the linguistic variables $T_{cold}$, $T_{warm}$, and $T_{hot}$.

A second one of the two groups provides pressure measurements which are separated into membership sets of light, medium, and heavy. When fuzzified, a degree of membership of the second system input in the light, medium, and heavy membership sets is referred to using one of the linguistic variables respectively labeled $P_{light}$, $P_{medium}$, and $P_{heavy}$. After the system inputs have been fuzzified, the degree of membership of the first and second system inputs in each of the respective membership sets is stored in a predetermined location in memory. Additionally, rules must be evaluated to provide appropriate actions. Assume in this example that three rules which are to be evaluated have the following forms:

(1) Rule 1: If temperature is cool ($T_{cool}$) and pressure is light ($P_{light}$), then (Action 1) and (Action 2);

(2) Rule 2: If temperature is warm ($T_{warm}$) and pressure is medium ($P_{medium}$), then (Action 3); and (3) Rule 3: If pressure is medium ($P_{medium}$), then (Action 3).

Note that each of the rules has a form which typically has the form:

(4) If (Fuzzy Input 1) and (Fuzzy Input 2), then (Action X) and (Action Y).

During rule evaluation, the "if" portion of the rule is evaluated first to determine a minimum degree of membership value. The "if" portion of the rule includes both the Fuzzy Input 1 value and the Fuzzy Input 2 value. A common method to determine rule strength is to determine a minimum degree of membership of the fuzzy inputs being evaluated. Other implementations do exist, however. For example, a strength of a rule may be calculated as the sum of the degrees of membership of each of its antecedents. Similarly, the degrees of membership may be multiplied or manipulated in any type of calculation to determine a rule strength.

In this implementation, the strength of the rule is only as strong as the weakest component. The weakest degree of membership value is used to determine a rule strength value of each of the actions specified in the "then" portion of the rule. In the rule shown in form (4), a rule strength corresponding to a minimum of the Fuzzy Input 1 and Fuzzy Input 2 values is stored in a first and a second address location in internal memory 32 pointed to by the addresses of the Action X and Action Y values, respectively. Each of the rule strengths corresponding to a predetermined one of the plurality of action values is used to provide a fuzzy output value which corresponds to a respective action. The fuzzy output value may then be defuzzified to perform an operation specified by the user. Although only two fuzzy input values and two action values are provided in form (4), either more or less values may be provided. The user of microprocessor chip 310 determines the form of the rules and may provide any number of fuzzy inputs or actions to be performed.

In the implementation of the invention described herein, internal memory 32 is generally used for memory storage. However, other memory circuits (not shown) external to microprocessor chip 310 may also be used. Implementation and use of such external memory circuits is well known in the data processing art and should be apparent to one of ordinary skill. For example, each of the fuzzy inputs may be stored in the form:

| Memory Address | Fuzzy Inputs | Comment |
| --- | --- | --- |
| $1000 | $00 | Tcold |
| $1001 | $33 | Tcool |
| $1002 | $CC | Twarm |
| $1003 | $00 | Thot |
| $1004 | $00 | Plight |
| $1005 | $FF | Pmedium |
| $1006 | $00 | Pheavy |

Array 1

As illustrated in Array 1, for the two system inputs, temperature and pressure, a degree of membership denoted as a "Fuzzy Input" is provided for each membership set for each system input. As was previously described with reference to FIG. 1, a first system input is a temperature of 58 degrees Fahrenheit. The temperature of 58 degrees Fahrenheit was fuzzified to have a degree of membership of $00 in the cold and hot membership sets, a degree of membership of $33 in the cool membership set, and a degree of membership of $CC in the warm membership set. As shown in Array 1, the values of both the $T_{cold}$ and $T_{hot}$ variables are $00, which indicates that the first system input is not in either of those two membership sets. However, the first system input has a $T_{cool}$ with a value of $33 and a $T_{warm}$ with a value of $CC. Therefore, the first input does have a degree of membership of $33 in the cool membership set and a degree of membership of $CC in the warm membership set.

Similarly, a second input is fuzzified to indicate a degree of membership of $00 in both the light and heavy pressure membership sets. Therefore, the values of both the $P_{light}$ and $P_{heavy}$ variables are $00, which indicates that the second input is not included in either of those two membership sets. However, the second input does have a degree of membership of $FF in the medium membership set. Therefore, the $P_{medium}$ variable has a value of $FF.

After the step of fuzzification and the storage of the fuzzy inputs into memory, a rule evaluation process is performed on the fuzzy inputs, resulting in the production of fuzzy outputs, which are also stored in memory, such as internal memory 32 or RAM 314. These fuzzy outputs are then processed through a defuzzification step, which is well-known in the art, which may make use of output membership functions stored in the knowledge base of the system, to produce the system outputs.

The present invention implements a fuzzy rule base as a collection of instructions which execute themselves. The user of system 313 uses these instructions to perform the rule evaluation portion of the process illustrated in FIG. 4. As discussed above, each of these instructions is retrieved and decoded to perform their particular operations with respect to the fuzzy input and fuzzy output values.

Figure 5:
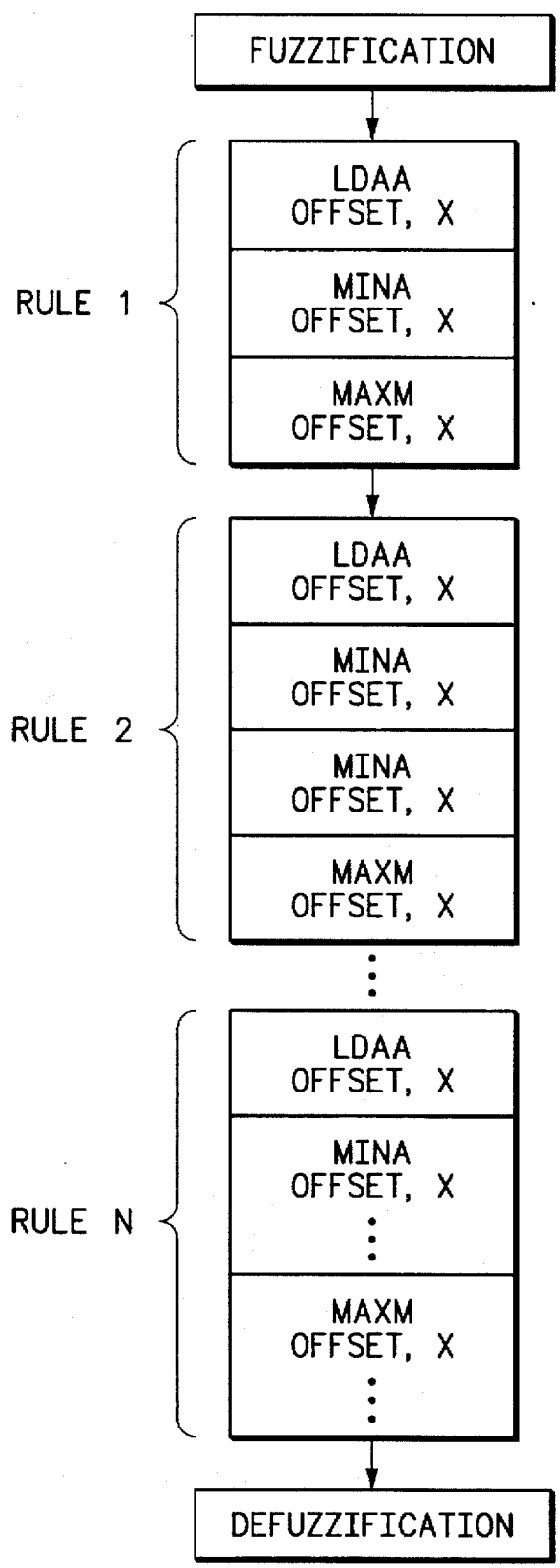
FIG. 5 illustrates instructions for performing rule evaluation in accordance with the present invention.

Referring next to FIG. 5, there is illustrated an example flow of a rule evaluation process utilizing the instruction set in accordance with the present invention. After the fuzzification process, wherein fuzzy inputs are stored in memory, for each rule to be evaluated, a set of instructions are retrieved and decoded for operation on the fuzzy inputs. The first instruction, LDAA, is an instruction to load accumulator 58 with a first fuzzy input value, which may be found at a memory location indicated by an offset value provided with the retrieved instruction.

Note, the fuzzy inference kernel will store the fuzzy inputs in predesignated memory locations. These predesignated memory locations are known and used within the instruction, which retrieves the fuzzy inputs as being stored in memory locations located by an offset number from a particular memory address.

A next instruction, MINA, retrieves a second fuzzy input value from memory and calculates whether this fuzzy input value is less than or greater than the previously retrieved fuzzy input value now in accumulator 58. In other words, it performs a minimum operation for determining which of the two fuzzy input values is a minimum value. Whichever has a minimum value, this value will be stored in accumulator 58. Since Rule 1 only has two fuzzy inputs, the next instruction retrieved and decoded is a MAXM instruction, which retrieves a pre-existing consequence value and determines if it is less than or greater than the value in accumulator 58. Whichever value is greater is then stored within a memory location designated by the MAXM instruction. FIG. 5 shows a continuation to a second rule, Rule 2, which has three fuzzy inputs. A minimum of these three fuzzy inputs is calculated and stored within accumulator 58. This value in accumulator 58 is then compared by the MAXM instruction to the aforementioned consequence value stored in memory, or to another consequence value stored in memory. This may continue on with any number of evaluations of rules, until one or more fuzzy output values are produced and then stored within memory for later defuzzification.

Note that if all the offsets to fuzzy input and output values are within a certain "distance" from the reference pointer, the code size for the object code for implementing the instruction set can be reduced further.

During operation, a user may provide the instruction set to microprocessor chip 310 through a software program stored either externally or in internal memory 32. Should the instruction set be provided by a source external to microprocessor chip 310, the instruction set would be input via external data bus 33 to external bus interface 30. External bus interface 30 would subsequently provide the instruction set to CPU 12 via internal data bus 34. If the instruction set was provided by a software program in internal memory 32, the instruction set would be provided to CPU 12 via internal data bus 34. In CPU 12, execution unit 14 would provide the instruction set to instruction decode logic circuit 18 in response to control signals received from each of bus control logic circuit 16, control unit 20, and sequencer 22.

Additionally, each of the components of CPU 12 receive timing control signals via Timing Control bus 38. Routing and use of such timing control signals are well known in the data processing art and, as such, will not be discussed in detail herein.

Instruction decode logic circuit 18 decodes each of the instructions to provide a plurality of control and information signals necessary for the proper execution of each of fie instructions. Upon receipt and decoding of the instructions, execution unit 14 begins the steps necessary to evaluate a plurality of fuzzy inputs stored in internal memory 32.

Note, the rule evaluation portion is performed completely with instructions and does not use a rule data structure in data memory (knowledge base), as is utilized in U.S. Pat. No. 5,263,125.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

Although fie present invention and its advantages have been described in detail, it should be understood that various changes, substitutions and alterations can be made herein without departing from the spirit and scope of the invention as defined by the appended claims.

We claim:

1. A method for operating a data processor to perform a fuzzy logic operation, said method comprising the steps of:

performing a fuzzification process on one or more system inputs to produce one or more fuzzy inputs;

storing said one or more fuzzy inputs in memory;

performing a rule evaluation process of a first rule by retrieving a first set of decoded processor instructions representing rules which (1) retrieve said one or more fuzzy inputs from said memory, (2) produce one or more fuzzy outputs, and (3) store said one or more fuzzy outputs in said memory, wherein said first set of decoded instructions perform said rule evaluation process without using a rule data structure in data memory; and performing a defuzzification process on said one or more fuzzy outputs to produce one or more system outputs.

2. The method as recited in claim 1, wherein said first set of decoded instructions perform a min/max operation with respect to said one or more fuzzy inputs and said one or more fuzzy outputs.

3. The method as recited in claim 2, wherein said step of performing said rule evaluation process further comprises the steps of:

a) processing a first instruction which retrieves one of said one or more fuzzy inputs and loads it into an accumulator;

b) processing a second instruction which retrieves another one of said one or more fuzzy inputs and performs a minimum operation between said fuzzy input stored in said accumulator and said another one of said one or more fuzzy inputs and then stores a result of said minimum operation in said accumulator;

c) repeating step b) if there is another fuzzy input; and d) processing a third instruction which retrieves a predetermined fuzzy output and performs a maximum operation between said predetermined fuzzy out-put and said result stored in said accumulator and then stores a result of said maximum operation in said memory.

4. The method as recited in claim 1, wherein said one or more fuzzy inputs and said one or more fuzzy outputs are stored in RAM.

5. The method as recited in claim 1, wherein said rule evaluation process is performed only with decoded instructions.

6. The method as recited in claim 1, wherein said first set of decoded instructions are retrieved from ROM.

7. The method as recited in claim 1 further comprising the step of:

retrieving a second set of processor instructions representing a second rule.

8. The method as recited in claim 7 further comprising the steps of:

retrieving said one or more fuzzy inputs from said memory;

producing one or more fuzzy outputs; and storing said one or more fuzzy outputs in said memory, wherein a number of instructions in the second set of decoded processor instructions is selectively programmable.

9. The method as recited in claim 1 wherein a first one of the first set of instructions includes an offset value to indicate a location in said memory for retrieving said one or more fuzzy inputs.

* * * * *